United States Patent [19]

Gitterman, III

[11] Patent Number: 5,799,998
[45] Date of Patent: Sep. 1, 1998

[54] IMPROVED BEDDING FORK AND BEDDING FORK WALL ASSEMBLY

[76] Inventor: Joseph L. Gitterman, III, 55 Shinar Mountain Rd., Washington Depot, Conn. 06794

[21] Appl. No.: 758,150

[22] Filed: Nov. 25, 1996

[51] Int. Cl.$^6$ .............................. A01D 9/00; A01B 1/20
[52] U.S. Cl. .............................. 294/59; 294/51; 294/55.5
[58] Field of Search ........................ 294/1.3, 1.4, 19.2, 294/49, 51, 52, 55, 55.5, 56, 59, 60; 56/400.04, 400.11, 400.19

[56] References Cited

U.S. PATENT DOCUMENTS

| | | | |
|---|---|---|---|
| 530,892 | 12/1894 | Fuller | 294/51 |
| 818,100 | 4/1906 | Kormil et al. | 294/55.5 |
| 1,107,583 | 8/1914 | Burchell | 294/51 |
| 1,442,671 | 1/1923 | Krehbiel | 294/51 |
| 1,935,510 | 11/1933 | Lofton | 294/51 |
| 3,094,348 | 6/1963 | Preziosi | 294/55.5 |
| 3,310,332 | 3/1967 | Nelson | 294/1.4 |
| 5,069,026 | 12/1991 | Johnson | 56/400.11 |

*Primary Examiner*—Dean Kramer
*Attorney, Agent, or Firm*—Howard S. Reiter, Esq.

[57] ABSTRACT

An improvement that enhances hay rakes or forks of the type used in the cleaning of horse stables, includes a wall assembly having a rear wall and two spaced-apart side walls extending from the rear wall, that are positioned relative to a hay fork of conventional design so as to restrict unintended displacement of hay/manure mixtures over the peripheral edges of the hay fork. The bottom edge of the rear wall has a U-shaped indentation and includes a mounting flange of U-shaped cross section aligned with and extending from the indentation for straddling the handle of a conventional hay fork so that the wall assembly is retained and positioned properly relative to the fork portion of the hay fork. The rear wall and the side walls are formed with interlocking rails and slots so that the side walls may be readily attached to and detached from the rear wall by a sliding motion. An opening through the mounting flange receives a fastener to secure the wall assembly to the handle of a hay fork. A resilient latch near the forward end of each side wall is capable of engaging a tine of a hay fork to further secure the wall assembly to the fork. The wall assembly may be provided entirely independently of a hay fork for attachment to an existing fork structure, or it may be integral with the fork structure.

8 Claims, 3 Drawing Sheets

ND BEDDING
IMPROVED BEDDING FORK AND BEDDING FORK WALL ASSEMBLY

BACKGROUND OF THE INVENTION

This invention relates generally to rakes or forks of the type used in the cleaning of horse stables and the like, and relates more specifically to an improvement that enhances the functioning and efficiency of such rakes. Rakes of this type are commonly identified as bedding rakes because they are used in the handling of bedding materials, such as hay, straw, sawdust and the like, for domestic animals. Such rakes, having a plurality of parallel spaced apart tines extending in cantilever fashion from a common base end that is attached to an elongate, generally cylindrical handle have been well known in this art for many years. Early models of such rakes or forks, the two terms being used interchangeably herein, were assembled from many pieces, using one or more of various types of wood, and more recently have been molded from different types of plastic material; some of the later rakes of plastic material have been molded in one piece and others have been assembled from two or more separate pieces.

Independently of the materials used in their manufacture, or the method or manner of their assembly, prior art rakes generally have not recognized or provided for effective and efficient use in the environment of a stable or barn. The floor of a such structures is customarily covered by a layer of bedding material provided by the stable operator, for the safety and comfort of the horses. Due to unavoidable natural processes, the bedding, such as hay, tends becomes mixed, after a period of use, with horse manure and other particulate contaminants. When the stable is being cleaned to remove the manure and contaminants, rakes are used to lift the hay from the stable floor in a shovel-like or scoop-like movement.

For reasons of economy as well as ecology, it is desirable to separate the hay, i.e. bedding, from the manure to the greatest extent possible so that the hay may be reused by returning it to the stable floor relatively free of manure. In customary manner, the manure is separated from the hay by allowing it to fall under the force of gravity through the spaces between the tines of the fork. The bedding material that remains supported on the tines of the fork is then thrown to one side in a pile from which it may be redistributed to the floor after the fallen manure has been removed in a safe and convenient fashion.

To facilitate separation of the manure from the hay, it is customary for an operator to shake or vibrate the fork gently; the effectiveness of this operation often depends on the skill and experience of the operator because excessive shaking will cause significant quantities of the hay to fall from the periphery of the fork at the same time that the manure is being separated, while too little shaking will expend the operator's energy inefficiently by not accomplishing any worthwhile or improved separation.

Accordingly, it is an object of this invention to provide a hay fork improvement that will increase the efficiency with which manure may be separated from bedding after a mixture of the two has been scooped from a stable floor.

Yet another object of this invention is to provide a fork improvement that increases the amount of bedding/manure mixture that may be processed on the fork at one time.

It is another and further object of this invention to provide a hay fork improvement that permits the fork to be shaken or vibrated more vigorously to separate manure from bedding material without displacing significant quantities of the material from the periphery of the fork.

It is still another object of this invention to provide a fork improvement that may be added readily and at low cost to existing hay forks of conventional construction.

BRIEF DESCRIPTION OF THE INVENTION

A feature of this invention is the provision of a wall assembly for a fork that extends along the common base of the tines of a hay fork and at least partially along the two spaced-apart outer edges thereof, at or near right angles to the plane that is generally defined by the longitudinal direction of the tines.

These and other and further objects, features and advantages of this invention will be made apparent to those having skill in this art by reference to the following specification and the accompanying drawings in which:

DETAILED DESCRIPTION OF THE INVENTION

Figure 1:
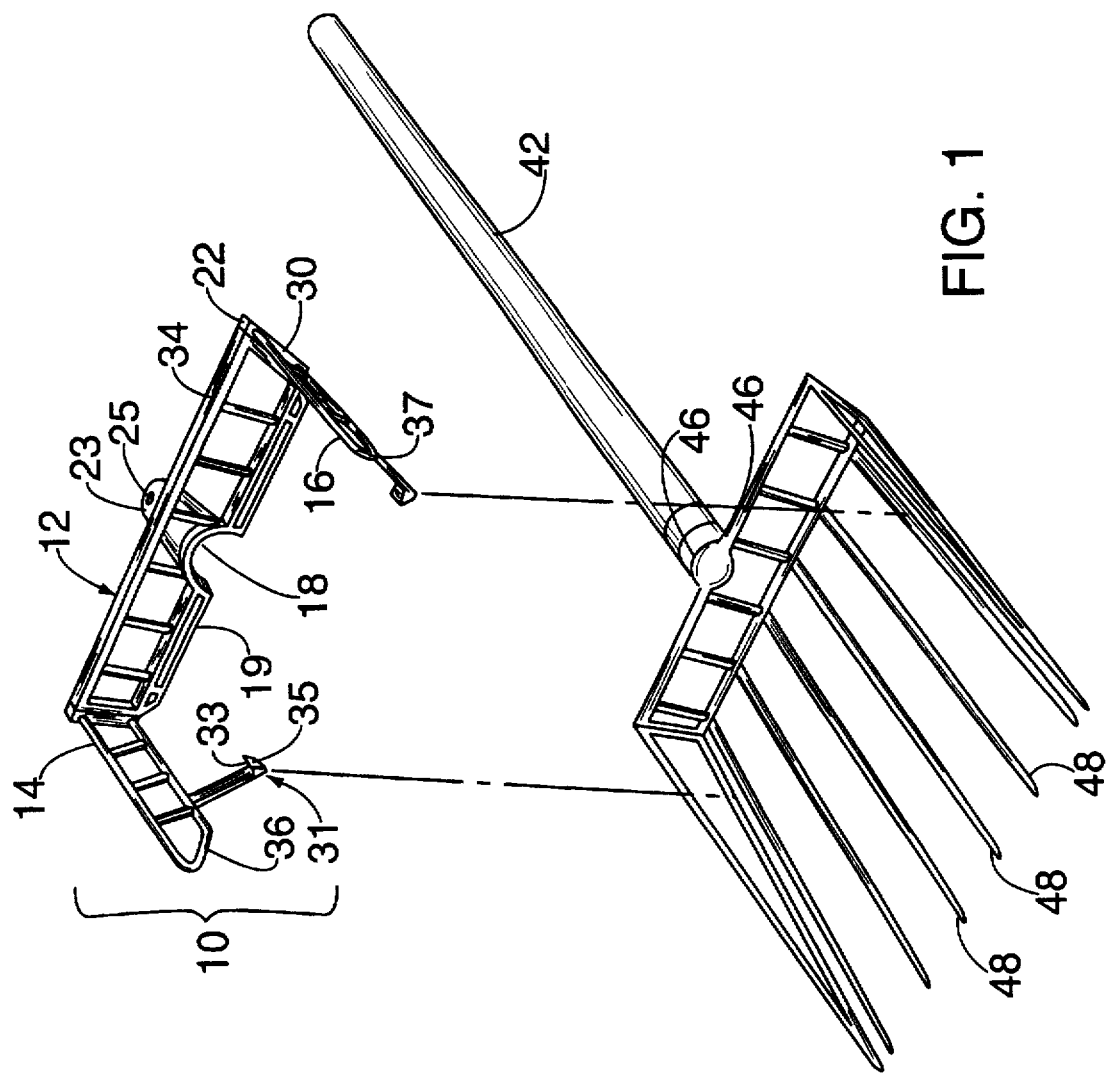
FIG. 1 is a pictorial representation of a hay fork and a wall assembly in accordance with this invention shown in "exploded" relationship to better illustrate their relationship.

Referring now more particularly to the drawings, a wall assembly 10 for a hay fork in accordance with this invention may be seen to comprise a rear wall element 12 and two spaced apart side wall elements 14 and 16 that extend forwardly from the rear wall element 12 in a substantially perpendicular direction, and the rear wall element 12 incorporates a substantially U-shaped indentation 18 in the lower longitudinal edge 19 thereof, for attachment to a hay fork 40. The hay fork 40, of known configuration, embodies an elongate handle member 42 attached to the base portion 46 of a fork assembly 44. The fork assembly 44, of known design incorporates a plurality of parallel, spaced apart tines 48 extending from the base portion 46 in generally planar relationship wherein the plane of the tines is tilted at a slight angle to the axis of handle member 42.

When the wall assembly 10 is attached to a hay fork 40, the rear wall element 12 and the side wall elements 14, 16 of wall assembly 10 stand approximately perpendicular to the substantially common plane defined by the tines of the fork assembly. The exact angle between the planes of the wall elements and the plane of the tines is not critical provided only that the angle is close enough to upright so that the wall elements serve to restrict unintended transverse displacement of material that is supported on the tines of a fork to which the wall elements are attached.

Figure 2:
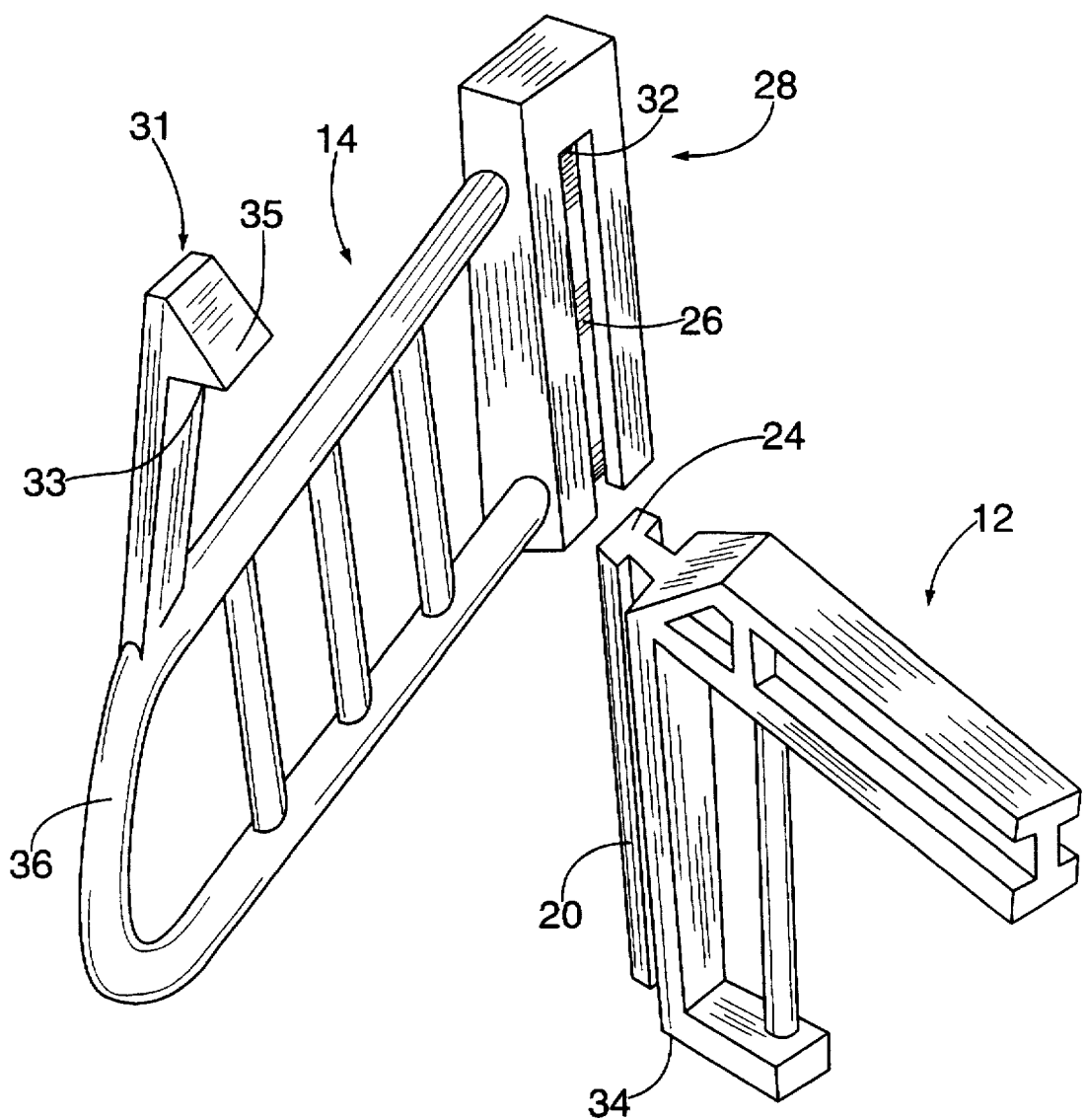
FIG. 2 is a partial pictorial representation of a detail of the wall assembly of FIG. 1 showing how two parts of the wall assembly are coupled to each other.

In the embodiment of the invention illustrated in FIGS. 1 and 2, side wall elements 14, 16, can be seen to be separably attached to rear wall element 12. The outer end edges 20 and 22 of rear wall element 12 each include a T-shaped rail portion 24 that is matingly received in a matching T-shaped slot 26 formed along one side of the rear edges 28, 30, respectively, of side wall elements 14, 16, to secure the side walls to the rear wall. The T-slots 26 preferably include a stop structure 32 at the bottom end of each slot so that the side wall cannot slide past the top edge 34 of rear wall element 12;. When wall assembly 10 is secured to a fork assembly 40 in accordance with this invention, the fork assembly underlies the side wall elements 14, 16 and prevents them from separating from the rear wall 12 by sliding in a downward direction, and the stop structures 32 within the T-slots 26 prevent the side wall elements from separating from the rear wall element by sliding in the upward direction; sidewall elements 14, 16 accordingly are securely captured in position when the rear wall element is secured to a hay fork as described below.

In addition to the U-shaped indentation 18 formed in the lower longitudinal edge 19 of rear wall element 12, the rear wall element further includes a mounting flange 23 of substantially U-shaped cross-section aligned with and extending axially from the indentation 18 for receiving the handle member 42 of a hay fork 40 in the indentation so that it extends continuously through and beyond the cross-section of the mounting flange. The mounting flange 23 serves to anchor and position wall assembly 10 relative to both fork assembly 44 and handle member 42. A transverse opening 25 extending through flange 23 serves to receive a fastener such as screw 27 which can replace the fastener ordinarily used to secure fork assembly 44 to handle member 42, so that a single fastener then serves to secure both wall assembly 10 and fork assembly 44 to handle 42 and to each other.

With further reference to FIGS. 1 and 2, side wall elements 14, 16 may be seen to include toward the forward or "free" end of each, a depending latch element 31 having an upwardly oriented latching shoulder 33, thereon. The latching element 31 is formed and dimensioned to be resiliently deflectable so that when the wall assembly 10 has been secured to the handle 42 of a hay fork 40, latching shoulder 33 may be resiliently deflected laterally past an abutting tine of fork assembly 44 until shoulder 33 passes the tine and engages the side of the tine that is remote from the side wall from which the latch extends. To further facilitate lateral deflection of the latching element as it is forcibly moved past a tine in the depending direction of the latch, a cam surface 35 leads toward the latching shoulder 33 at an angle of less than ninety degrees to the surface of shoulder 33; surface 35 acts as an inclined ramp cam to deflect the latch away from the tine as the tine "climbs" up the inclined surface. When the tine is fully past the end of the ramp surface 35, the latch returns to its "at-rest" position with the shoulder 33 positioned in opposed relationship with the exterior surface of a tine. The latch accordingly will be seen to secure the forward end of the side wall 14, 16 to the fork assembly 44 while the rearward end of each side wall is captured in position as explained above.

Figure 3:
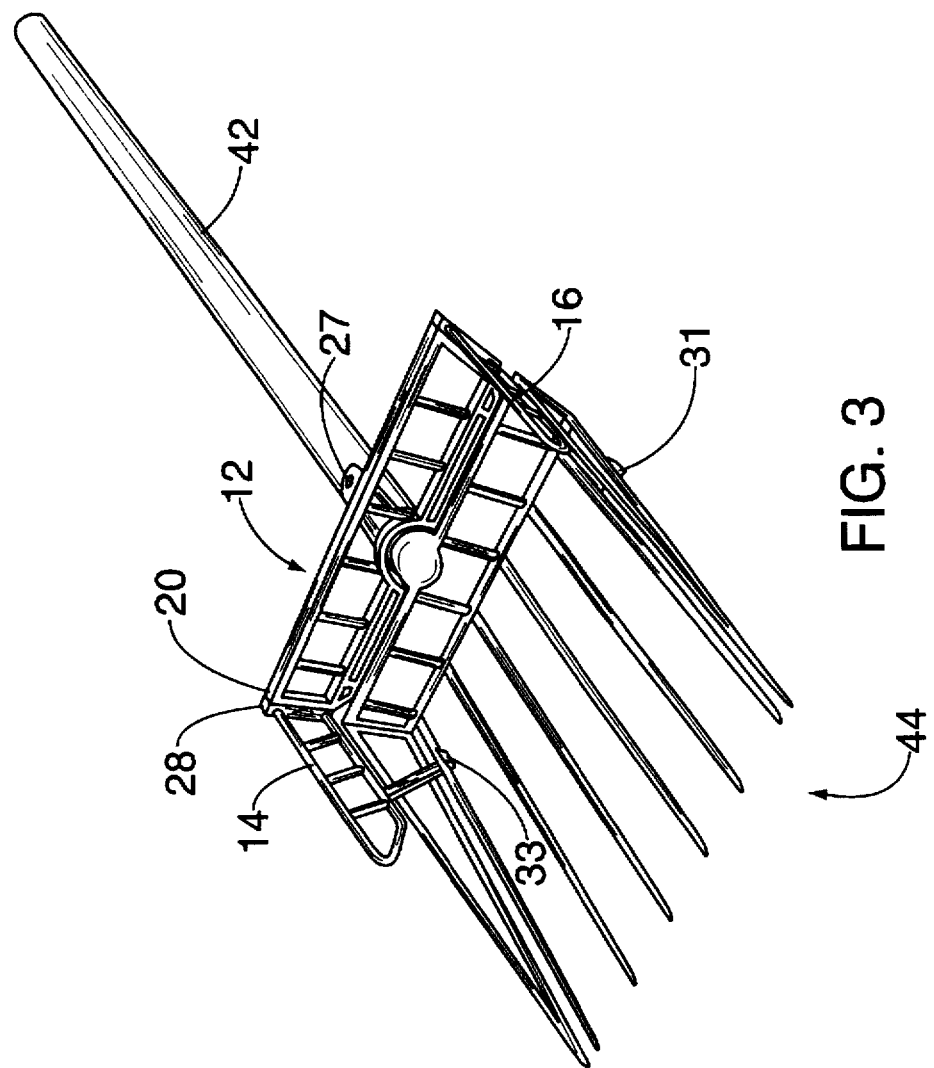
FIG. 3 is a pictorial representation of a fully assembled hay fork in accordance with this invention.

In the embodiment of FIG. 3, the wall assembly 10 is shown fully integrated with a hay fork 40. Mounting flange 23 is secured to handle member 42 by a threaded 27, and the latches 31 near the free ends 36, 37 of side walls 14, 16 are integrally attached to two different tines 48 of the fork assembly 44.

Although specific embodiments of this invention have been disclosed, it will be apparent that various other and further forms and embodiments within the scope of this disclosure and the accompanying claims, may be visualized, readily, by those having skill in this art.

I claim:

1. A wall assembly, for attachment to a hay fork instrument of the type having a fork array of parallel prongs attached to and extending from one end of an axially extending elongate handle member, said wall assembly comprising:

a rear wall element characterized by a front surface on one side thereof, a rear surface on the other side thereof, first and second spaced-apart side edges and a bottom edge portion extending from the first side edge to the second side edge;

said bottom edge portion having a substantially U-shaped indentation formed therein midway between its ends, and a mounting flange of substantially U-shaped cross-section aligned with and extending axially from said indentation for receiving the handle member of a hay fork instrument in said indentation and in the cross-section of said mounting flange;

first and second spaced-apart side wall elements, coupled to said rear wall element proximate said first and second side edges thereof respectively, and extending from said front surface of said rear wall element from a fixed end proximate said rear wall element to a free end remote from said rear wall element;

each of said first and second side wall elements having a depending latching element extending therefrom for engaging different tines in the fork array of a hay fork instrument in latching relationship to secure said side wall elements thereto;

each depending latching element being resiliently deflectable from its at-rest position and having a transversely projecting latching shoulder for engaging a surface of a tine in a fork array.

2. A wall assembly for attachment to a hay fork in accordance with claim 1, wherein:

each depending latching element further includes a camming surface adjacent and leading into each said latching shoulder at an angle of less than ninety degrees to facilitate deflection of said latching element from its at-rest position when said latching element is forcibly moved past a tine in its depending direction.

3. A wall assembly in accordance with claim 1 wherein: said U-shaped mounting flange is characterized by an opening therethrough for receiving a fastener to secure said flange to a handle member received in said mounting flange.

4. An improved hay fork comprising:

an axially extending elongate handle member;

a fork array attached to said axially extending handle and having a base member and a plurality of parallel spaced-apart tines extending at substantially right angles to said base member in a substantially common plane;

a rear wall element coupled to said base member and extending substantially upwardly relative to said substantially common plane of said tines, said rear wall element characterized by a front surface on one side thereof proximate said tines, a rear surface on the other side thereof, first and second spaced-apart side edges and a bottom edge portion extending from the first side edge to the second side edge;

said bottom edge portion having a substantially U-shaped indentation formed therein midway between its ends, and a mounting flange of substantially U-shaped cross-section aligned with and extending axially from said indentation having a portion of the axial length of said handle member received within said indentation and within the cross-section of said mounting flange;

a fastener member securing said mounting flange to said handle member with said bottom edge portion of said rear wall element in substantially parallel, adjacent relationship with said base member of said hay fork;

first and second spaced-apart side wall elements coupled to said rear wall element proximate said first and second side edges respectively, each side wall element extending from said front surface of said rear wall element beginning at a fixed end proximate said rear wall element and extending substantially parallel to said tines to a free end remote from said rear wall element;

said first side wall element having a securing element integrally formed therewith proximate the free end thereof securing said sidewall element to one tine of said fork array, and said second side wall element having a securing element integrally formed therewith proximate the free end thereof securing said sidewall element to another tine of said fork array.

5. In a hay fork of the type having an axially extending elongate handle member attached at one end thereof to a fork array of parallel spaced-apart tines extending at substantially right angles to a base member, the improvement comprising a hay fork wall assembly attached to said hay fork wherein said hay fork wall assembly comprises:

- a rear wall element characterized by a front surface on one side thereof, a rear surface on the other side thereof, first and second spaced-apart side edges and a bottom edge portion extending from the first side edge to the second side edge;
- said bottom edge portion having a substantially U-shaped indentation formed therein midway between its ends, and a mounting flange of substantially U-shaped cross-section aligned with and extending axially from said indentation having a portion of the axial length of said handle member received within said indentation and within the cross-section of said mounting flange;
- a fastener member securing said mounting flange to said handle member with said bottom edge portion of said rear wall element in substantially parallel, adjacent relationship with said base member of said hay fork;
- first and second spaced-apart side wall elements coupled to said rear wall element proximate said first and second side edges respectively, each side wall element extending from said front surface of said rear wall element beginning at a fixed end proximate said rear wall element and extending to a free end remote from said rear wall element;
- said first side wall element having a securing element integrally formed therewith proximate the free end thereof securing said sidewall element to one tine of said fork array, and said second side wall element having a securing element integrally formed therewith proximate the free end thereof securing said sidewall element to another tine of said fork array.

6. The improved hay fork of claim 5, wherein: said first and second sidewall elements are separably coupled to said rear wall element.

7. The improved hay fork of claim 6, wherein: said first and second sidewall elements are separably coupled to said rear wall element by means of a slide rail formed on one of said side wall element and said rear wall element and an interlocking slide slot formed on the other of said side wall element and said rear wall element for slidably receiving said slide rail in interlocking relationship.

8. The improved hay fork of claim 5, wherein: said mounting flange includes a transverse hole extending therethrough and said mounting flange is fastened to said elongate handle member by a threaded fastener extending through said transverse hole.

* * * * *